No. 706,415. Patented Aug. 5, 1902.
A. HITCHON.
DRIVING GEAR FOR AUTOMOBILES.
(Application filed Apr. 12, 1902.)
(No Model.) 2 Sheets—Sheet 1.
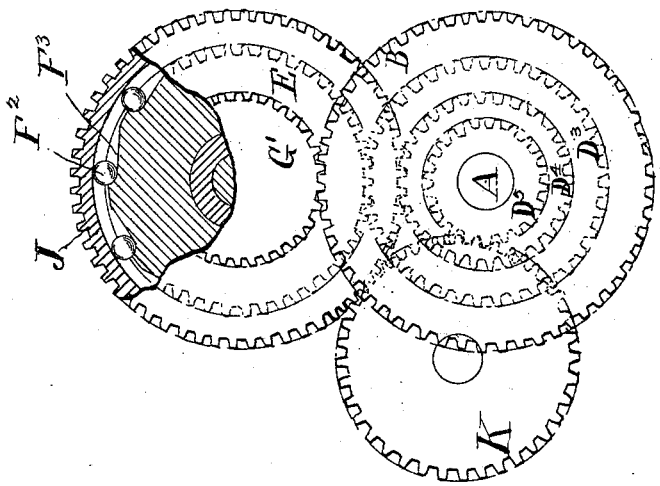
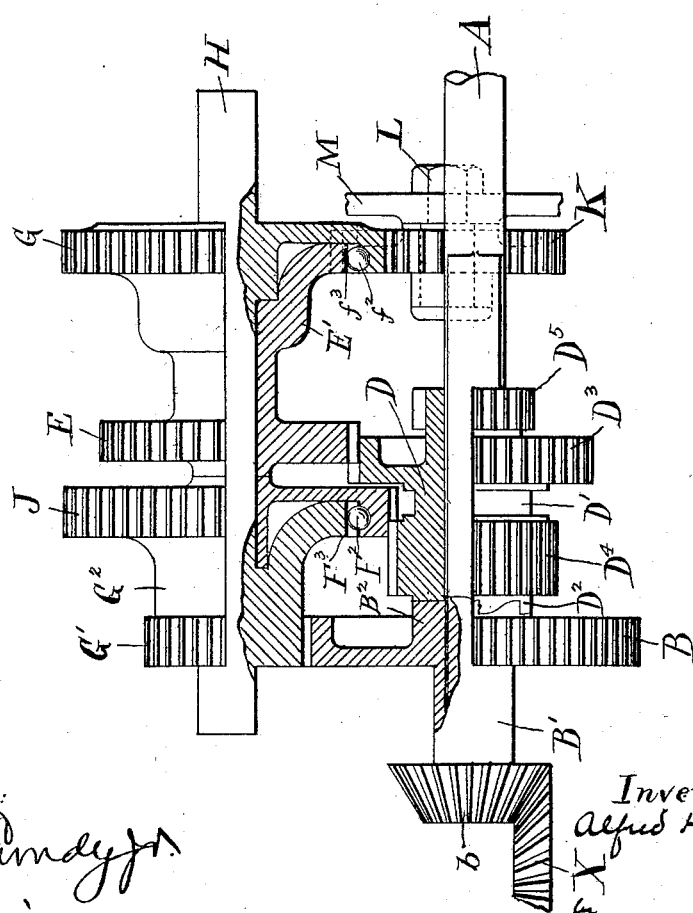

No. 706,415. Patented Aug. 5, 1902.
A. HITCHON.
DRIVING GEAR FOR AUTOMOBILES.
(Application filed Apr. 12, 1902.)
(No Model.) 2 Sheets—Sheet 2.
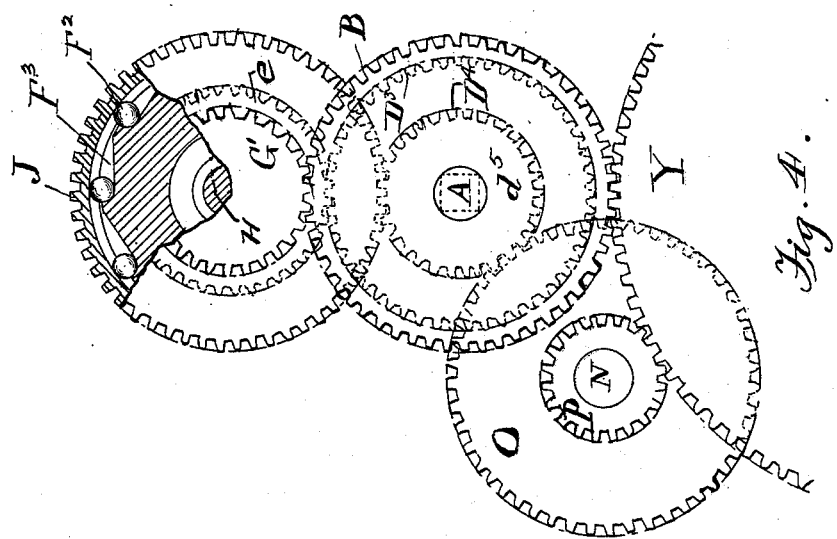
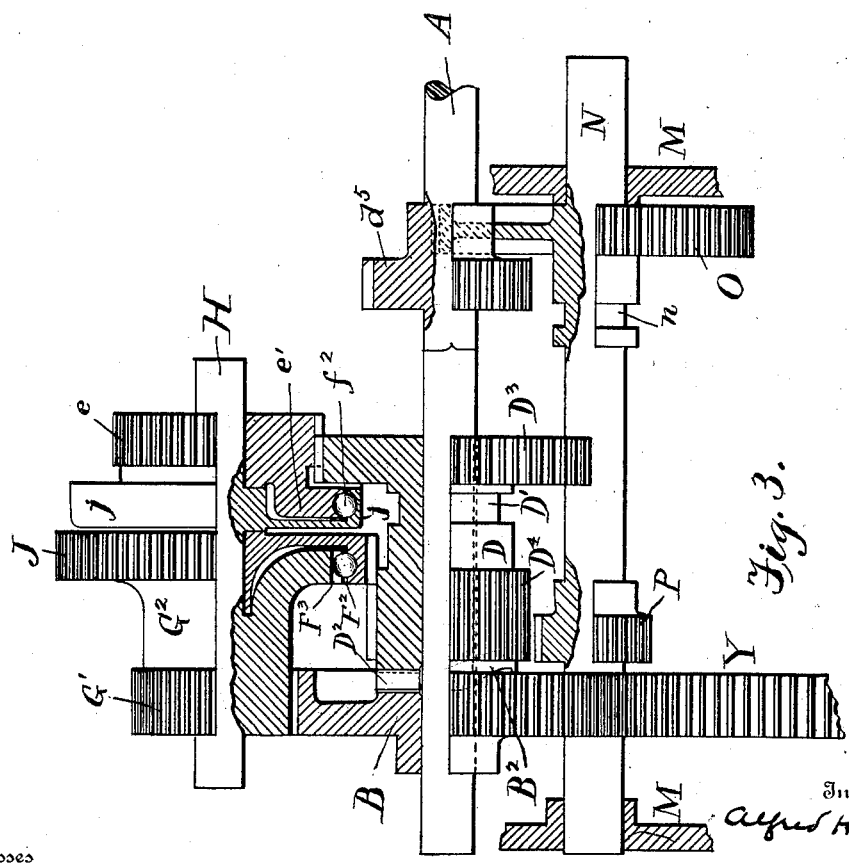

UNITED STATES PATENT OFFICE.

ALFRED HITCHON, OF CLAYTON-LE-DALE, ENGLAND.

DRIVING-GEAR FOR AUTOMOBILES.

SPECIFICATION forming part of Letters Patent No. 706,415, dated August 5, 1902.

Application filed April 12, 1902. Serial No. 102,498. (No model.)

*To all whom it may concern:*

Be it known that I, ALFRED HITCHON, of Clayton Manor, Clayton-le-Dale, in the county of Lancaster, England, have invented a new and useful Improvement in Driving-Gearing for Automobiles, of which the following is a specification.

This invention relates to variable-speed-transmission appliances for automobiles. For this purpose various speed-changing mechanisms have been employed, that which is most extensively used at present consisting of a series of toothed purchase-gears made changeable by the aid of several sets of tooth-clutches which the driver of the automobile car must operate in order to change from one speed to another. These so-constructed multiple-speed change wheels or clutches require to be connected or disconnected from each other in timely order, also handled with careful judgment and consideration as to their relative revolving speeds, and though even when manipulated with care when their tooth formations are being brought together for making their separate connections a smash to the gears or the operating-lever connection being strained out of order is not an uncommon occurrence.

The object of this invention is to permit of a plurality of changing speeds or purchasing power with an automobile transmission-gearing built in such a manner that one hand operating-lever can be made to change or control different speeds and purchasing powers being given to the engine for the driving of the car either with a forward or backward movement and to provide speed-changing clutches with self-gripping devices whereby when an alternate difference to the revolving motion is made between the connecting-hub part of such wheels and the clutch-wheel proper such hubs become locked or unlocked to or from each other, by which means it is no longer necessary to directly couple up to the speed-changing operating hand-lever for operating all the speed changes—as, for example, if such operating hand-lever is only coupled directly to the highest or quickest revolving driving clutch-pinion on such clutch being withdrawn during driving the second speed-revolving self-gripping clutch would automatically take action in continuing the driving of the car, though at a slower speed, without any further interference or movement of the operating hand-lever.

I will first describe the manner in which my invention is or may be carried into effect by reference to the accompanying drawings, forming part of this specification, and will then point out more particularly in the claim that which I believe to be new and of my own invention.

In the drawings the framework of the vehicle, the hand operating connecting-levers, and the shaft-bearings are omitted in order to give a clearer view of the parts in which my invention more particularly resides.

Figure 1 is a sectional front elevation of an arrangement of mechanism adapted for three different speeds forward and one reverse. In this arrangement the car-axle to be driven (typified by the beveled gear X) is at right angles to the driving-shaft. Fig. 2 is an end elevation, partly in section, of the mechanism shown in Fig. 1. Fig. 3 is a front sectional elevation; and Fig. 4 is an end elevation, partly in section, of a modified arrangement in which the car-axle to be driven (typified by the toothed wheel Y) is parallel with the driving-shaft.

In Figs. 1 and 2, A is part of the primary driving-shaft of the transmission-gearing. It is connected to and driven by the engine in any suitable way, and it has loosely mounted on it the final differentially-driven gear B of the gearing-train. The gear B is provided on its outer face with a boss B', on which is the beveled gear $b$, engaging the like gear X on the driving-axle of the automobile car. On the other or inner face of the gear B is one member $B^2$ of a tooth-clutch. The other member $D^2$ of the said tooth-clutch is on the opposite end of a bush or sleeve D, which is mounted on and revolves at all times with the driving-shaft A, but can slide lengthwise thereon, for which purpose the part of shaft A on which the sleeve D moves is squared and the bore of the sleeve is correspondingly formed. In the exterior of the sleeve is a suitable annular groove formation D' to receive the fork of the operating-handle by which said sleeve is shifted or slid lengthwise of shaft A. If the clutch-faces $B^2 D^2$ be engaged, (and they are thus shown in the drawings,) then they transmit a direct drive from shaft A to the final differentially-driven gear B, and in this way I obtain the first and highest forward speed. The next lower forward speed is obtained as follows: Fast upon or formed in one with the bush D is a spur-wheel $D^3$, which gears with the toothed "shell-wheel" E, which is mounted and can revolve freely upon a shaft H, supported in suitable bearings parallel with the driving-shaft A. This free shell-wheel E has as part of it a circular untoothed portion E', having in its periphery inclined or wedge-shaped pockets $f^3$ (similar to those shown in Fig. 2 at $F^3$) to receive balls $f^2$, which are held in these pockets by the overhanging rim of a toothed wheel G, which is fast upon the shaft H. While the clutch-faces $D^2 B^2$ are in engagement and the wheel B is being driven direct from shaft A, the wheel $D^3$ will be in engagement with and will drive the shell-wheel E; but at this time the wheel E is revolving as an idle wheel, because the final gear B meshes with and drives a wheel G', which is fast upon shaft H. Consequently the wheel G revolves in the same direction with and also, owing to the proportioning of the gearing, at a greater speed than the shell wheel E E', the pockets $f^3$ in that wheel being so inclined that at this time the balls will be in the deepest part of the pockets; but if the bush D be moved along far enough to the right to disengage the clutch-faces $B^2 D^2$ then shaft H ceases to be driven from the gear-wheel B and becomes the medium through which said wheel B is driven through the automatic action of the shell-wheel E E', (driven as it is from the wheel $D^3$,) which through the balls $f^2$ and the suitable inclined ball-inclines of the pockets $f^3$, in which said balls are contained, now grips the inner face of wheel G, compelling the latter to revolve with it. As wheel G is fast on shaft H, the said shaft revolves also, and motion therefrom is transmitted to the gear B through the wheel G', which also is fast on said shaft H. In this way the second and next lower forward speed is obtained. The third and lowest forward speed is obtained as follows: The hub $G^2$ of the wheel G' is formed as a disk in the periphery of which are formed inclined ball-pockets $F^3$, containing balls $F^2$, which are held in their pockets by the overhanging rim of toothed wheel J, which is mounted loosely on the shaft H, so as to revolve freely thereon. The wheel J meshes with and is driven by a pinion $D^4$, fast on or formed in one with the bush D. While the gear B is being driven at either of the higher speeds, the wheel J is driven as an idle wheel from pinion $D^4$; but when the bush D is slid along to the right on shaft A far enough to carry the pinion $D^3$ out of engagement with the wheel E then while pinion $D^4$ continues to drive wheel J the latter is no longer a free-running wheel, because the shaft H is no longer driven from wheel E, and consequently the overlapping rim or shell of the wheel J will automatically grip the hub $G^2$ through the grip-balls $F^2$ and the suitably-formed inclined ball-pockets $F^3$, thereby transmitting the drive through wheel G' to gear B, thus giving to the latter the third and lowest forward speed. On sliding the bush D still farther to the right along the shaft pinion $D^4$ will be carried beyond and out of gear with the wheel J, and the driving-shaft A consequently will cease to drive the gear B. A still further movement of the bush D in the same direction will bring a pinion $D^5$, which is fast on it, into engagement with a toothed reversing-wheel K, mounted to revolve upon a stud L, suitably supported in the gear-casing, a portion of which latter is shown at M. The wheel K is also in gear with the wheel G and when driven by the pinion $D^5$ will cause wheel G to revolve in backward or reverse direction, and as wheels G and G' are fast on shaft H the gear B, with which G' is in engagement, will have a reverse or backward movement of rotation.

In Figs. 3 and 4 the arrangement so far as concerns the three different forward speeds is substantially the same in a general way as that already described in connection with Figs. 1 and 2. In Figs. 3 and 4 shafts A H, gear B, sleeve or bush D, annular groove D', and clutch-faces $B^2 D^2$, gears G' $G^2$, wheel J, pockets $F^3$, ball $F^2$, and pinion $D^4$ correspond in arrangement and mode of operation to the like lettered parts in Figs. 1 and 2. The wheel Y, driven from gear B, is supposed to be upon the axle of the car to be driven, the axle (not shown) being parallel to driving-shaft A. The pinion $D^3$ corresponds to the like lettered part in Fig. 1. It engages a tooth-wheel $e$ $e'$, (similar to wheel E E' in Fig. 1,) loose on shaft H and having in the periphery of $e'$ inclined pockets to receive balls $f$, which are held therein by the overhanging rim of a disk $j$, which, like the wheel J, is rigidly fixed to shaft H. The three different forward speeds are obtained by sliding the bush D along the shaft A, and the arrangement and mode of operation of the parts for this purpose are substantially the same as already described in connection with Figs. 1 and 2. The reverse movement is obtained as follows: When the bush D is slid to the right far enough to carry the pinion $D^4$ out of engagement with the wheel J, the engine ceases to drive gear B. To effect reverse or backward movement, I employ a shaft N, rotatably and also longitudinally movable in bearings in the gearing-casing M and provided with an annular groove formation $n$ for reception of the fork or other mechanism for giving the shaft lengthwise movement. Upon the shaft are fixed two wheels O P, the former to engage with the wheel $d^5$, fast on and revolving with the main shaft A, the latter to engage and drive the wheel Y of the car-axle. By sliding shaft N to the left from the position shown its wheels O P will be thrown into engagement with the wheels $d^5$ Y, and the movement of Y will consequently be reversed. Of course this should not be done until after the bush D has been moved far enough to the right to carry its wheel D⁴ out of engagement with wheel J.

In lieu of the roller type of self-gripping devices I may employ the ratchet-and-pawl type and other well-known types of self-locking devices.

Having described my improvements and the best way now known to me of carrying the same into practical effect, I state in conclusion that I do not limit myself narrowly to the structural details herein described, since manifestly the same can be considerably varied without departure from the spirit of the invention; but

What I claim herein as new, and desire to secure by Letters Patent, is as follows:

In variable-speed driving mechanism for automobiles, the combination with the driving-shaft and the driven wheel, of a plurality of sets of free-wheel clutch devices, motion-transmitting means between the same and the driven wheel, independent gearing between each set of said free-wheel clutch devices and the driving-shaft, and means, operated by a single handle, for withdrawing said gearing from connection with each set of free-wheel clutch devices successively, beginning with that giving the highest speed, the driving-gears for all speeds below the one inactive, remaining in operative connection with their respective free-wheel clutch devices, substantially as and for the purposes hereinbefore set forth.

In testimony whereof I have hereunto set my hand this 1st day of April, 1902.

ALFRED HITCHON.

Witnesses:
ERNALD SIMPSON MOSELEY,
ARTHUR VERNON BATHO.